June 23, 1970 P. R. NELSON 3,516,556
INTERLOCKING CARGO CONTAINERS
Filed July 21, 1967 5 Sheets-Sheet 1

INVENTOR.
PATRICK R. NELSON
BY Jack M. Wiseman
ATTORNEY

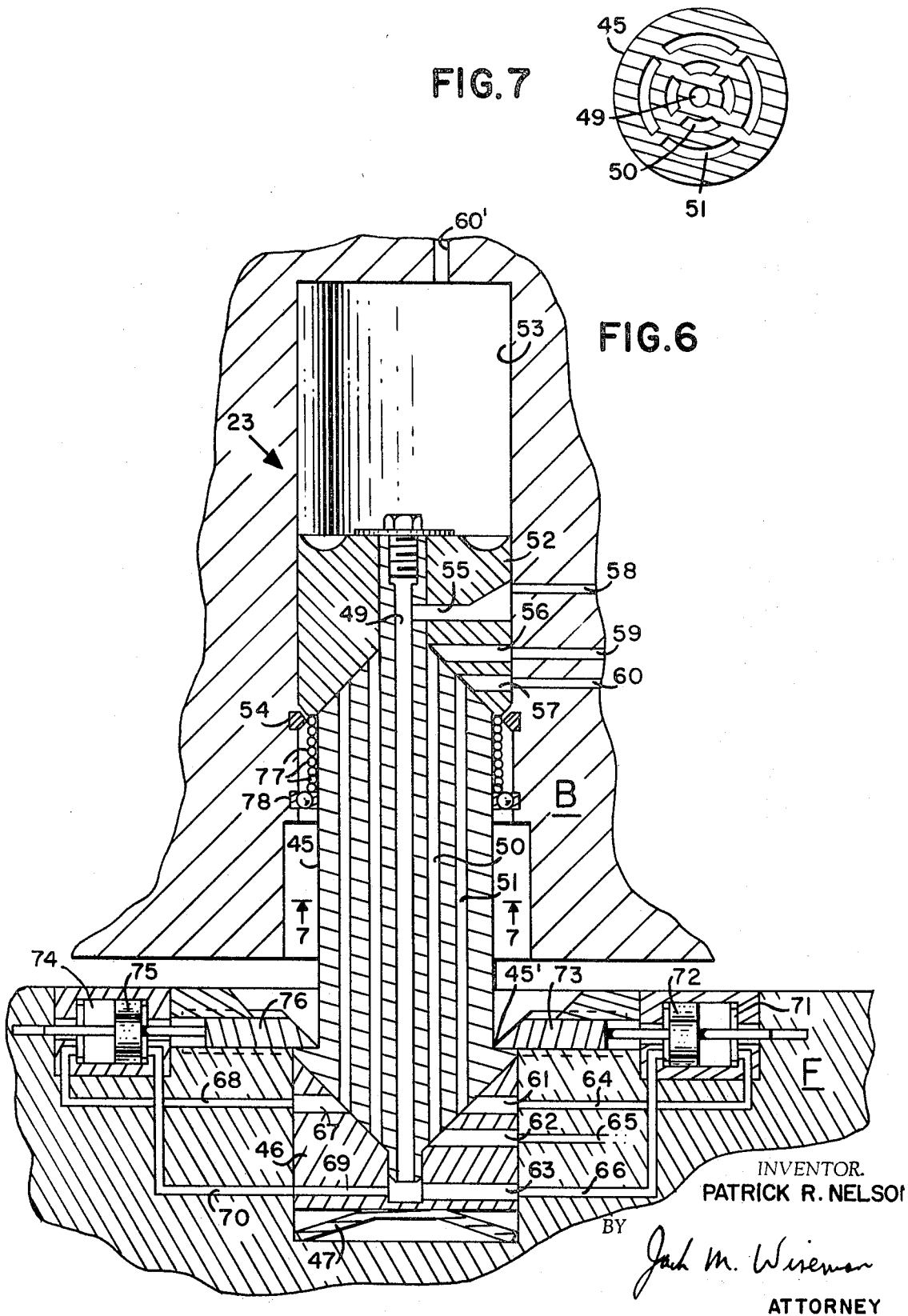

June 23, 1970 P. R. NELSON 3,516,556
INTERLOCKING CARGO CONTAINERS
Filed July 21, 1967 5 Sheets-Sheet 4

INVENTOR.
PATRICK R. NELSON
BY Jack M. Wiseman
ATTORNEY

INVENTOR.
PATRICK R. NELSON

United States Patent Office 3,516,556
Patented June 23, 1970

3,516,556
INTERLOCKING CARGO CONTAINERS
Patrick R. Nelson, 710 Independence Ave.,
Mountain View, Calif. 94040
Filed July 21, 1967, Ser. No. 655,038
Int. Cl. B65d 57/00
U.S. Cl. 214—10.5
2 Claims

ABSTRACT OF THE DISCLOSURE

The present invention relates to material handling apparatus wherein a cargo container of dimensions which are multiples of a unit cube is employed. Each multiple of the unit surface area has a uniform pattern of extendible connectors, so that such containers may be compactly stacked and locked together. The bottom of each container has spherical wheels or other bearing members, and the top of each container has grid pattern track for engaging the bearing members and permitting movement of one container over the top of another container. The interior wall of the container has a plurality of rails of T-shaped cross-section which permit a section of wall to be folded down and used as a loading ramp, the rails also serving to provide channels in which the contents of the container can be secured. In various embodiments, the walls are provided with embedded conductors or heating elements and with power transmission and storage cavities. Provision of a thermal barrier between cavities of different transverse cross-section permits a heat pump to be used to either refrigerate or heat the interior of the container.

---

The present invention relates in general to cargo containers, and more particularly to containers for cargo of less than full load lots.

Much inefficiency in present methods of transporting cargo of less than full load lots is attributable to the random manner and frequency in which such cargo is loaded and unloaded, as a result of the inadequate manner in which cargo is packaged.

It is an object of the present invention to provide a container in which various types and sizes of cargo of less than full load lots can be packaged, and which can be efficiently and compactly handled in conjunction with like containers.

Another object of the present invention is the provision of a container for cargo of less than full load lots which can be used for maintaining a suitable environment for said cargo during transportation, storage, warehousing and processing.

One feature of the present invention is the provision of a cargo container in which opposing surfaces have bearings and tracks so that one such container can be moved over the top of another such container.

Another feature of the present invention is the provision of a cargo container in which the walls are provided with rails which permit portions of the wall to be used as loading ramps for the container, and which also permit the contents of the container to be secured to the walls and to strengthen the walls.

Another feature of the present invention is the provision of a cargo container having the surface thereof divided into uniform segments with means for connecting adjacent such containers when a segment of one container is aligned with a segment of the other container.

Another feature of the present invention is the provision of a cargo container with extendible connectors for locking adjacent such containers when said containers are in a desired relative position.

Another feature of the present invention is the provision of a cargo container in which electrical conductors are embedded in the walls.

Another feature of the present invention is the provision of a cargo container in which the walls are formed with cavities which may be used for the storage and transmission of power.

Another feature of the present invention is the provision of a cargo container in which the walls are formed of interlocking panels to permit the assembly of various size containers and to facilitate the dismanteling.

Still another feature of the prescent invention is the provision of a cargo container having cavities in the wall which may be used in connection with a heat pump for refrigerating or heating the interior of the container.

These and other features and advantages of the present invention will become more apparent upon a consideration of the following description taken in connection with the accompanying drawing, wherein:

FIG. 6 is an enlarged cross-sectional view taken along line 6—6 in FIG. 5 and showing the details of the connectors used to lock adjacent containers together;

FIG. 7 is a cross-sectional view taken along line 7—7 in FIG. 6;

Figure 1:
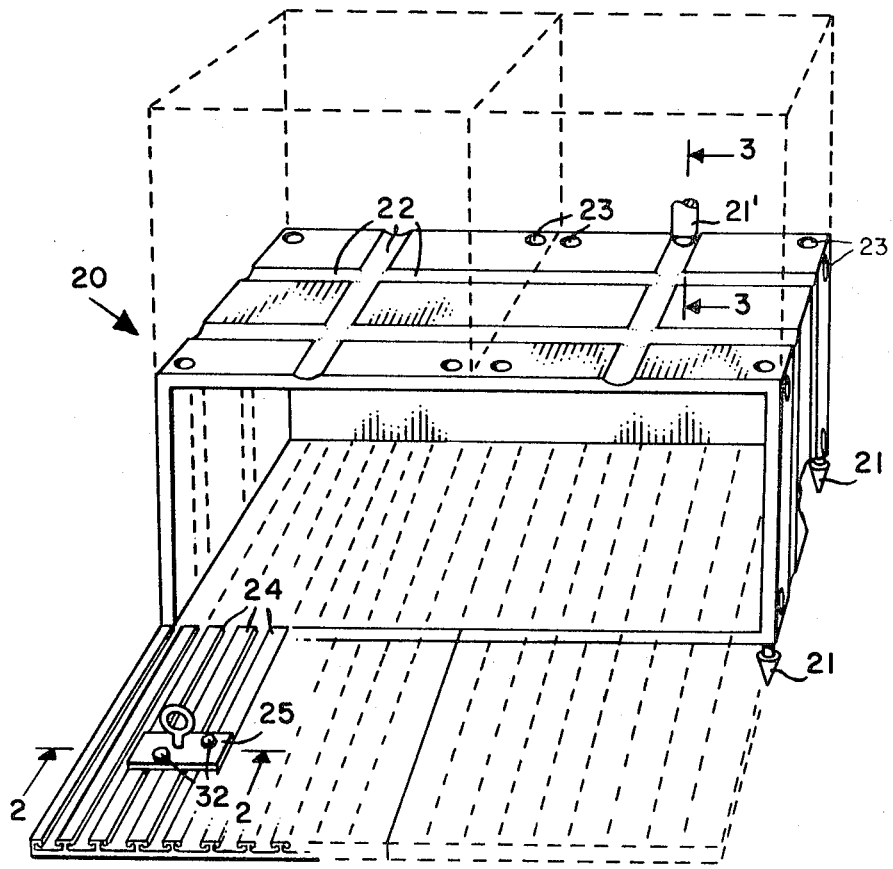
FIG. 1 is a perspective view of a cargo container in accordance with the present invention, shown with one side folded down to provide a loading ramp.

Referring to FIG. 1, a container 20 in accordance with the present invention is supported on spherical wheels 21. The top of the container 20 contains a grid-like pattern of track 22. The tracks 22 are adapted to receive the spherical wheels of a second container similar in construction to the container 20, whereby the second container may be moved over the top of the container 20 in order to facilitate stacking of containers. One such wheel 21' of the second container is shown in FIG. 1. Each exterior surface of the container 20 contains a plurality of connectors 23 arranged in square patterns or arrays to permit the modular stacking and locking of containers. The interior walls are constructed with rails 24 which are adapted to receive objects, such as an eye plate 25, which are to be fastened to the container 20. Moreover, the rails 24 are disposed vertically on the side walls which are each adapted to fold down in the manner shown in FIG. 1. Thus, the container 20 may be loaded from any side by folding down the wall on that side; and when such wall is folded down the rails 24 function as a ramp for sliding a load into the container.

Figure 2:
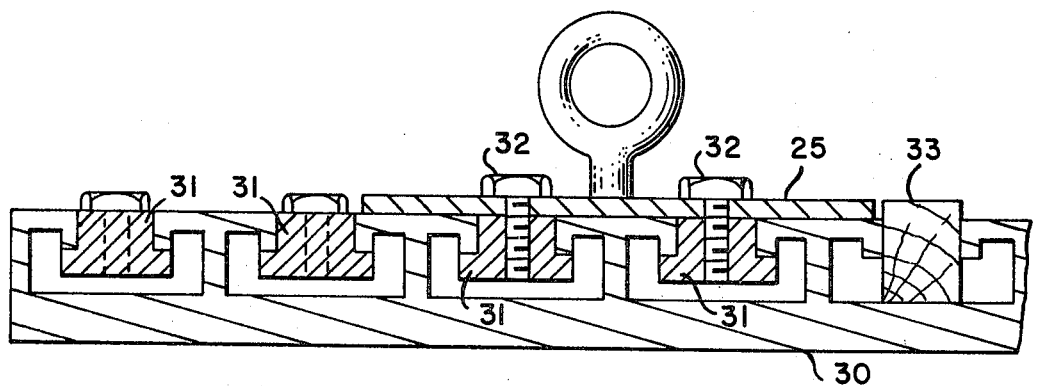
FIG. 2 is an enlarged cross-sectional view taken along line 2—2 in FIG. 1 and showing the details of the container wall construction.

The detailed construction of the walls of the container 20 is shown in FIG. 2. A base plate 30 which serves as the outer wall of the container 20 is formed integrally with the rails 24 which project from the plate 30 in a T-shaped cross section. The space between the rails 24 forms a channel for holding suitable fastener members 31. An object, such as the eye plate 25, which it is desired to fasten to the inside wall of the container 20, is secured to the member 31 by means of bolts 32. Thus, the rails 24 not only strengthen the wall and permit the sliding of cargo, but they also provide a plurality of channels for locating and securing a wide variety of structures. Wooden slats 33 may conveniently be inserted between certain of the rails 24 in order to absorb shock.

Figure 3:
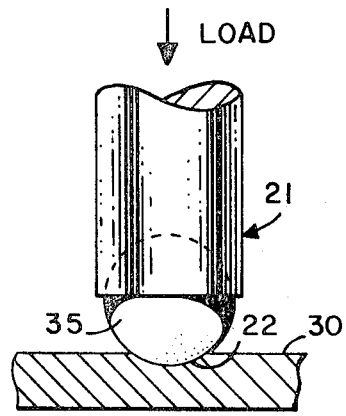
FIG. 3 is an enlarged cross-sectional view taken along line 3—3 in FIG. 1 and showing the details of the mating between the indented tracks on top of one container and the wheel bearings on the bottom of another container stacked on top of said one container.

The detailed construction of the wheels 21 is shown in FIG. 3. The wheel has a rotatable spherical bearing member 35 which fits into the track 22 which is formed as an indentation in the outer wall 30. It is apparent that the track could, alternatively, be formed by a pair of protrusions or rails. When the spherical wheels 21 are at the cross roads of the intersecting tracks 22, they permit movement of the cargo in either of two perpendicular directions.

Figure 4:
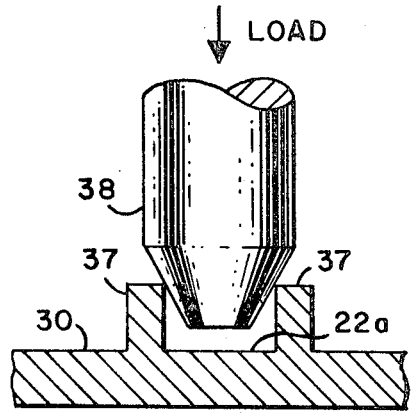
FIG. 4 is a cross-sectional view of a modification to the mating structure shown in FIG. 3 having a stationary bearing and a track formed of protruding rails.

It may be desirable to use fixed bearing members instead of the wheels 21. For example, the sphereical bearing member 35 in FIG. 2 could be made fixed rather than rotatable. Another fixed bearing configuration is shown in FIG. 4, which comprises a pair of rails 37 defining a track 22a for a conical bearing 38. The conical bearing, like the spherical bearing, permits the container 20 to be moved in either perpendicular direction when the bearing is at the intersection of the tracks.

Figure 5:
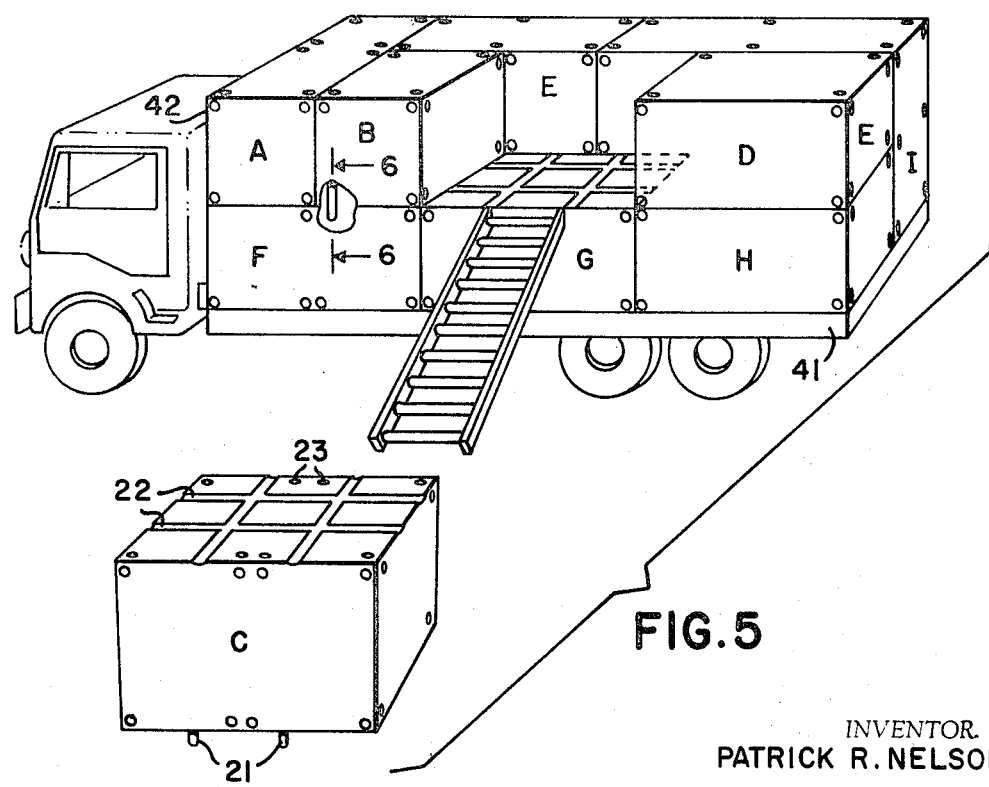
FIG. 5 is a perspective view of a truck being loaded with cargo containers in accordance with the present invention.

FIG. 5 illustrates the manner in which nine containers, A through I, constructed as described with reference to the container 20 of FIG. 1, are loaded into a truck 40. The bearings 21 and grid-pattern tracks 22 permit a great flexibility in loading. Thus, for example, container C can be loaded from the side as shown, or container D can be moved forward and container C loaded from the rear. It is apparent that the same flexibility exists as to the unloading of the containers.

The dimensions of all the containers is such that each is a multiple of a unit cube, each face of said cube including the area of one square array of connectors 23. As shown in FIG. 5, the configuration of container B is that of the unit cube and the configuration of all the other containers is obtained by combining two or more unit cubes, with the corresponding number of square arrays of connectors 23 on the outer surfaces. In addition, the horizontal bed 41 of the truck 40 and the vertical wall 42 of the truck 40 may contain similar tracks and arrays of connectors for accommodating the containers positioned adjacent thereto. Thus, a compact and structurally rigid structure is formed from the separate containers each containing different size loads. The containers may be readily and individually loaded and unloaded as the transportation process proceeds.

As is apparent from FIG. 5, the loading and unloading of cartons of different sizes require that each square array of connectors 23 be locked and unlocked simultaneously. A connector construction which permits this function to be performed automatically is shown in FIGS. 6 and 7. The particular connector 23 shown in FIGS. 6 and 7 is one which connects the bottom surface of container B with the top surface of the container F, it being understood that all of the connectors 23 may be of similar construction.

The connector 23 is shown in the locked position with a male shaft member 45 extending from the container B into a seating member 46 mounted above an annular spring 47 in a chamber 48 in the wall of the container F. The shaft member 45 consists of a hollow central rod and two concentric cylinders spaced apart to define a central opening 49 and two concentric annular openings 50 and 51. The shaft 45 is fixed to the end of a piston 52 which moves a chamber 53 in the wall of the container B. The piston 52 is stopped at its forward end of movement by a stop 54, and contains three radial openings 55, 56 and 57 which, in the forward end of movement, register with three ports 58, 59 and 60, respectively, in the wall of the container B. A fourth port 60' in the wall of the container B opens into the piston chamber 53. The three openings 55, 56 and 57 in the piston 52 also register with the concentric openings 49, 50 and 51, respectively, in the shaft 45, which concentric openings register with three openings 61, 62 and 63, respectively, in the seat 46 and these openings, in turn, register with ports 64, 65 and 66, respectively, in the wall of the container F. The annular opening 51 also registers with an opening 67 in the seat 46 which, in turn, registers with a fourth port 68 in the wall of the container F; and the central opening 49 also registers with an opening 69 in the seat 46 which, in turn, registers with a fifth port 70 in the wall of the container F. Ports 64 and 66 lead to opposite ends of a piston chamber 71 containing a piston 72 which carries a locking jaw 73 into the position shown for engaging an annular shoulder 45' spaced from the outer end of the shaft 45. Similarly, ports 68 and 70 lead to opposite ends of a piston chamber 74 containing a piston 75 which carries a locking jaw 76 into the position shown for engaging the annular shoulder 45' of the shaft 45.

As shown in FIG. 6, the connector 23 is in the locked position. The male shaft member 45 of container B extends into the female seat member 46 of container F, and the shoulder 45' of the shaft member 45 is retained by locking jaws 73 and 76 against the upward urging of a return spring 77 which encircles the shaft 45 above a bearing seal 78 which is seated in the periphery of the shaft opening in wall of container B.

To unlock the connector 23, pressurized air or other fluid is applied through the ports 60' and 58. The fluid entering through the port 60' into the piston chamber 53 applies downward pressure on the piston 52 and moves the shaft 45 slightly downward as the force is transmitted through the seat 63 to the underlying spring 47 which flattens under the force. This movement of the shaft 45 unloads the locking jaws 73 and 76 which then retract due to the pressure of fluid entering the port 58 of the wall of container B and flowing down the central opening 49 in the shaft 45, through the openings 63 and 67 in the seat 46 and the ports 66 and 70 of the wall of container F, into the piston chamber 71 and 74 to exert outward force on the pistons 72 and 75. While the port 58 remains activated, holding the jaws 73 in the retracted position, the pressure in the piston chamber 53 is vented, whereupon the male shaft member 45 retracts into the wall of the container B due to the upward force of the return spring 77. After a slight delay, the pressure at the port 58 is removed.

To now re-lock the connector 23, pressurized air or other fluid is first applied through the port 60' to urge the shaft 45 downward from the container B into the seat 46 of the container F. Then the pressurized air or other fluid is applied to port 60 and flows through openings 57, 51, 61, 67, 64 and 68 into piston chambers 71 and 74 to exert an inward force on pistons 72 and 75 to move the jaws 73 and 76 into locking engagement with the shoulder 45' of the shaft 45. The actuated ports 61 and 60 are then vented.

The above-described operations for locking and unlocking the connectors 23 in FIG. 6 are performed simultaneously, in parallel, on each connector of a four-connector array. For example, after the container C is moved into position as shown in FIG. 5, two such arrays are energized for locking the eight connectors between container C and container G; one array is energized for locking the four connectors between container C and container B; one array is energized for locking the four connectors between container C and container J; one array is energized for locking the four connectors between container C and container I; and one array is energized for locking the four connectors between container C and container D.

It is to be noted that the connectors 23, in addition to providing physical connection between the containers, may also be used to provide electrical and fluid connections between the containers. Thus the connector member 45 and 46 in FIG. 7 may be used to complete an electrical circuit between the containers B and F; and the passageway from the port 59 through the openings 56, 50 and 62 into the port 65 may be used for transmitting fluid between the containers B and F.

Figure 8:
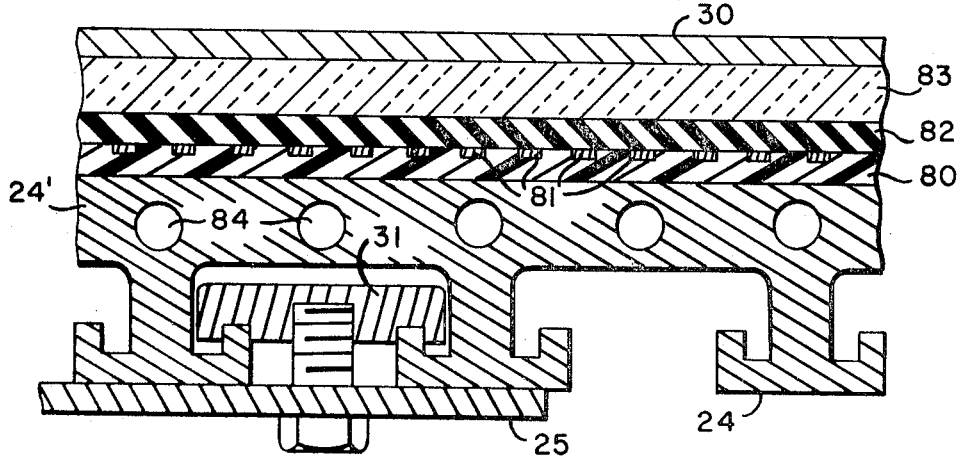
FIG. 8 is a cross-sectional view of a modification to the wall structure of FIG. 2 in which conductors are embedded in the wall and the wall contains cavities for the transmission and storage of power.
Figure 9:
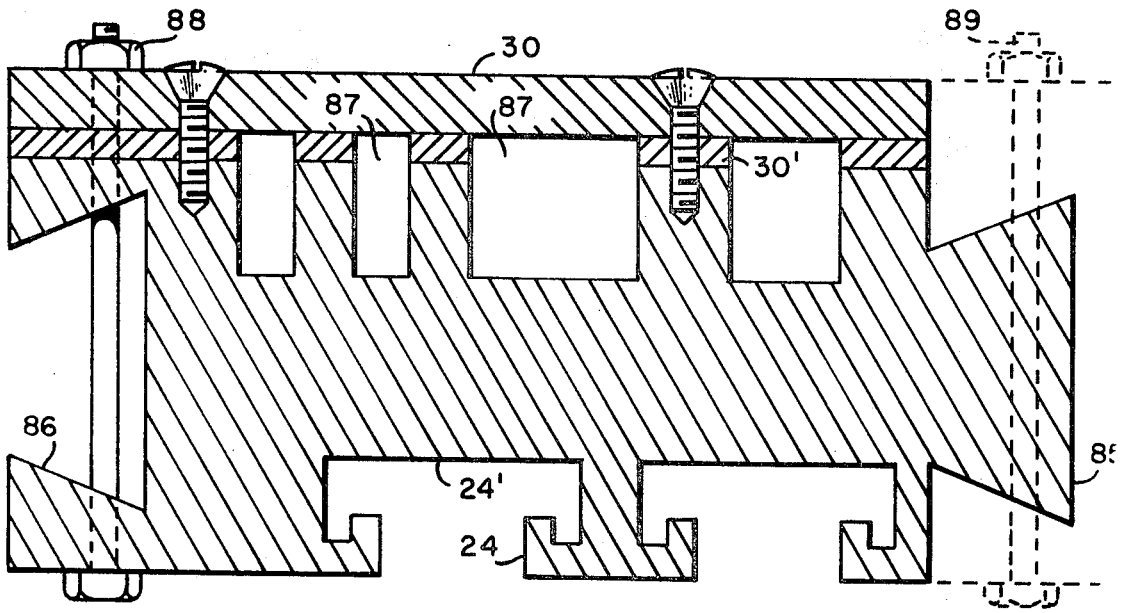
FIG. 9 is a cross-sectional view of a modification to the wall structure of FIG. 8 in which the wall is formed from interlocking panels.
Figure 10:
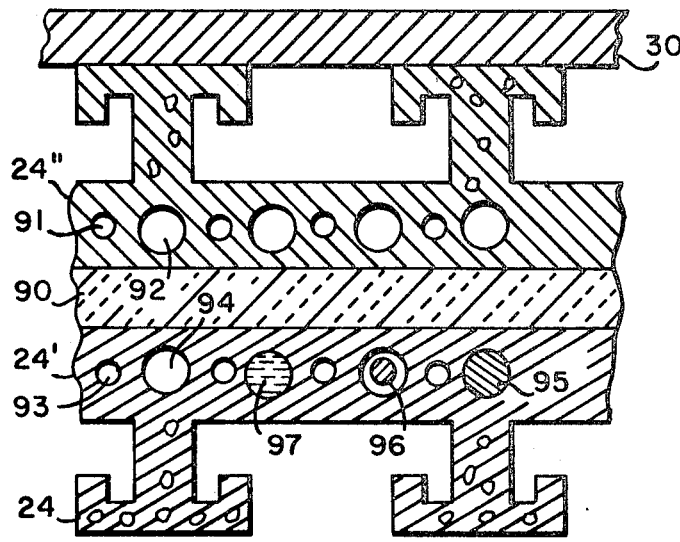
FIG. 10 is a cross-sectional view of another modification to the wall structure of FIG. 8 in which cavities are formed in a double walled structure with a thermal barrier.

FIGS. 8, 9 and 10 illustrate modifications to the wall construction shown in FIG. 2, which modifications permit the performance of a variety of functions for maintaining a proper environment for the cargo carried by the containers of the present invention.

In FIG. 8, the base plate 24' carrying the T-shaped rails 24 (which are preferably made integral with the base 24' by means of an extrusion) is separated from the outer wall 30 of the container by an electrically insulating, heat-conducting, layer 80, a plurality of strips 81 of conductor or semiconductor material deposited or printed on the layer 80 as a substrate, an electrically non-conducting layer 82, and a thermally-insulating layer 83. The layers 80, 81 and 82 form a sandwich, the center of which consists of the strips or sheets 81. By making the conducting strips 81 of a relatively low electrical resistance material, these strips can function as interconnecting electrical resistance material, these strips can function as interconnecting electrical conductors; and by making the strips 81 of a relatively high electrical resistance material, these strips can function to provide heat for the interior of the container. The strips 81 may alternate in conductivity, or form other combinations, to provide both conduction and heating. The layers 80, 81 and 82 may be made from a single laminated sandwich of plastic with the strips 81 in the middle. Another alternative would be to flame-spray or plasma-spray a thin sheet of low-thermal, high-electrical, resistance ceramic, such as $BeO_2$ or $ZrO_2$, onto the plate 24' to form the layer 80, and then flame-spray or plasma-spray a layer 82 of high-thermal, high-electrical, resistance ceramic on top of the strips 81. In this embodiment, cylindrical cavities 84 are formed in the rail base plate 24' to provide conduits for containing liquid, gas, electrical wiring, and the like. By closing the cylindrical cavities 84 at the ends, they may be used to form a fluid reservoir, or capacitor, or chamber. Moreover, the presence of the cylindrical cavities 84 serves to reduce the weight per unit volume of container.

FIG. 9 illustrates a modular panel form of wall construction, and also an alternate construction for providing cavities in the wall. Here the base plate 24' with the rail 24 thereon is formed with a male dovetail 85 at one end and a female dovetail 86 at the opposite end. Rectangular cavities 87, which function the same as the cylindrical cavities 84 in FIG. 8, are formed by channels in the inner surface of the rail base plate 24' which are accessible by the removal of the outer wall plate and an intermediate sealing gasket 30'. The wall is assembled from a plurality of panels such as shown in FIG. 9 with the male dovetail 85 of one panel inserted into the female dovetail of the adjacent panel. Bolts 88 and 89 extend through the mated dovetails and are tightened so as to deflect the extensions of the female dovetail 86 inwardly and form a metal-to-metal seal with the male dovetail inserted therein.

In FIG. 10, the wall is constructed in two parts, similar to that shown in FIG. 2, placed back-to-back and separated by a thermal barrier layer 90. Cylindrical cavities of various sizes are formed in both the inner rail plate 24' and the outer rail plate 24" so as to accommodate a variety of environmental control equipment. Cavities 93 and 94 in the interior wall 24' and cavities 91 and 92 in the exterior wall 24" may be used in connection with a heat pump as described with reference to FIG. 11. A rod 95 may be inserted in one of the cavities together with air trapped at one end of the rod 95; thus, if the rod 95 is attached to the cargo load and is free to move in the cavity, the trapped air can function as a spring for cushioning the cargo against high accelerations. Another cavity is shown as containing an electrical cable 96; and still another cavity is shown as containing fluid 97. It is apparent that the wall construction of FIG. 10, as well as the wall construction of FIGS. 2 and 8, can be formed in modular panels by means such as those described with reefrence to FIG. 9.

Figure 11:
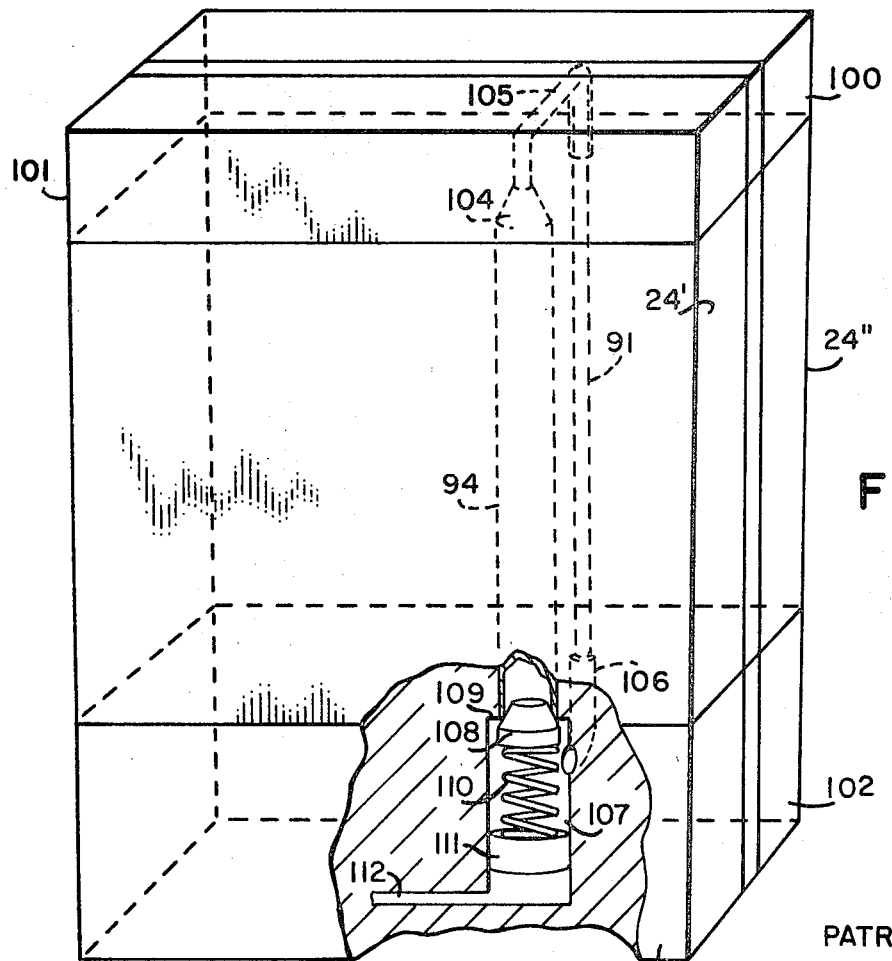
FIG. 11 is a partially-schematic perspective view, partially in section, of the wall structure of FIG. 10 used in connection with a heat pump for controlling the thermal environment of the cargo container.

FIG. 11 is a schematic diagram illustrating the use of the double wall construction of FIG. 10 in combination with a heat pump. A manifold 100 is provided at the upper end of the exterior wall 24"; a manifold 101 is provided at the upper end of the interior wall 24'; a manifold 102 is provided at the lower end of the exterior wall 24"; and a manifold 103 is provided at the lower end of the interior wall 24'. The top of the large cavity 94 in the interior wall 24' is connected to the top of the small cavity 91 in the exterior wall 24" by an expansion valve 104 and connecting cavity 105 which extends from the manifold 101 through the thermal barrier 90 and into the manifold 100. At the bottom of the structure, there are provided: a connecting cavity and output pressure valve 106 for the small cavity 91; a compressor cavity 107 in axial alignment with the large cavity 94; an input vacuum valve 108 which is seated in a sealing flange 109 at the bottom of the cavity 94; a retaining spring 110 disposed beneath the valve 108; a piston or diaphragm 111 disposed beneath the spring 110; and a pulsating pneumatic input port 112 for operating the piston 111.

In operation, the large cavity 94 of interior wall 24' functions as an expansion cavity and the small cavity 91 of exterior wall 24" functions as a condenser cavity, whereby the exterior wall 24" is heated and the interior wall 24' is cooled to provide refrigeration for the interior of the container. In the alternative, the large cavity 92 of the interior wall 24' functions as the expansion cavity and the small cavity 93 of the exterior wall 24" functions as the condenser cavity, the interior wall 24' is heated and the exterior wall 24" is cooled to provide heating for the interior of the container.

It is to be understood that modifications and variations of the embodiments of the invention disclosed herein may be resorted to without departing from the spirit of the invention and scope of the appended claims.

Having thus described my invention, what I claim as new and desire to protect by Letters Patent is:

1. Cargo containing apparatus, comprising: a plurality of cargo containers each having dimensions which are a multiple of a unit cube, each container including structure having opposed surfaces with each container having bearing members on one of said opposed surfaces and the other of said opposed surfaces being grooved to form a plurality of tracks therein, said tracks being dimensioned to accommodate engagement with bearing members of other cargo containers and in a pattern to accommodate movement of said other containers within said tracks, said tracks extending to the edge of the associated surface to open onto the tracks of other containers when a plurality of containers are side-by-side; hydraulic connector construction means arranged in a uniform pattern including on at least one surface connecting means in a uniform pattern and on at least one other surface connector receiving means in a pattern coinciding to the pattern of the connecting means for locking adjacent containers together when said containers are in a predetermined position relative to each other and for unlocking said containers when it is desired to move one of said containers relative to the other, said hydraulic connector construction means including a plurality of coacting piston means responsive to a pressure fluid source for locking said connecting means of a container to said connector receiving means of an adjacent container, port means mounted in said container for receiving fluid from said source, said container including an interior wall structure, said interior wall structure comprising a base member with receiving means for securing a cargo load placed within said containers, means mounting at least one wall of said containers so that said one wall when in a predetermined position can function as a loading ramp for the respective container.

2. Cargo containing apparatus comprising: a plurality of cargo containers each having dimensions which are a multiple of a unit cube, each of said containers including an exterior containing structure having opposed surfaces with each container having bearing members on one of said opposed surfaces and the other of said opposed surfaces being grooved to form a plurality of tracks therein, said tracks being dimensioned to accommodate engagement with bearing members of other cargo containers and in a pattern to accommodate movement of said other containers within said tracks, said tracks extending to the edge of the associated surface to open onto the tracks of other containers when a plurality of containers are side-by-side; each of said containers further comprising a uniform connector construction pattern including on at least one surface connecting means in a uniform pattern and on at least one other surface connector receiving means in a pattern coinciding to the pattern of the connecting means for locking adjacent containers together when said containers are in a predetermined position relative to each other and for unlocking said containers when it is desired to move one of said containers relative to the other, the connecting means of the connector construction includes a first chamber, a first piston in said first chamber, a shaft member, the movement of which is responsive to the movement of said first piston within said first chamber, one end of the shaft adapted for locking engagement with the connector receiving means of another container, a second chamber, a second piston located in said second chamber, said connector receiving means including locking means responsive to the movement of said second piston within said second chamber, port means mounted in said containers for receiving a pressurized fluid source and extending to said first and second chambers, the port means adapted for the fluid to apply pressure against said pistons to force said shaft in locking engagement with the connector receiving means and when in the locked position to apply pressure against said pistons to release the locking engagement.

References Cited

UNITED STATES PATENTS

| | | | |
|---|---|---|---|
| 1,287,759 | 12/1918 | Russell | 105—366 |
| 1,900,867 | 3/1933 | Olds | 214—152 |
| 2,701,065 | 2/1955 | Bertel | 214—16.1 |
| 3,289,382 | 12/1966 | Van Der Lely | 214—6 |

GERALD M. FORLENZA, Primary Examiner

R. B. JOHNSON, Assistant Examiner

U.S. Cl. X.R.

220—23.4